March 17, 1959  H. J. LANDRETH  2,877,549
PIPE CUTTER

Filed Feb. 3, 1958  2 Sheets-Sheet 1

INVENTOR
Herschel J. Landreth.

BY

AGENT

INVENTOR
Herschel J. Landreth.

BY

AGENT

United States Patent Office 2,877,549
Patented Mar. 17, 1959

2,877,549

PIPE CUTTER

Herschel J. Landreth, Portland, Oreg.

Application February 3, 1958, Serial No. 713,000

3 Claims. (Cl. 30—99)

This invention relates generally to tools for transversely severing rigid hollow cylindrical pipe used as structural members, protective casing for elements partially filling the interiors thereof or for fluid conductors. Electric conduit and water piping are typical examples of such pipe.

More particularly this invention relates to a novel and useful form of pipe cutter having a cutter carrying hub rotatably carried in a handle structure and driven by a ratchet engagement therewith.

It is the primary purpose of this invention to provide a pipe cutter for the purpose of cutting transversely through a pipe when the pipe is fixed in a position so close to an adjacent structure that the usual form of pipe cutter can not be turned completely about the axis of the pipe when the cutter is rotatably secured to the pipe in the desired cutting position.

How this and other objects are attained will become apparent on reference to the following description referring to the attached drawings which show two desirable species through which the genus of this invention may be practiced.

Referring now to the drawings.

Like reference numerals refer to like parts in the several figures of the drawings.

Figure 2:
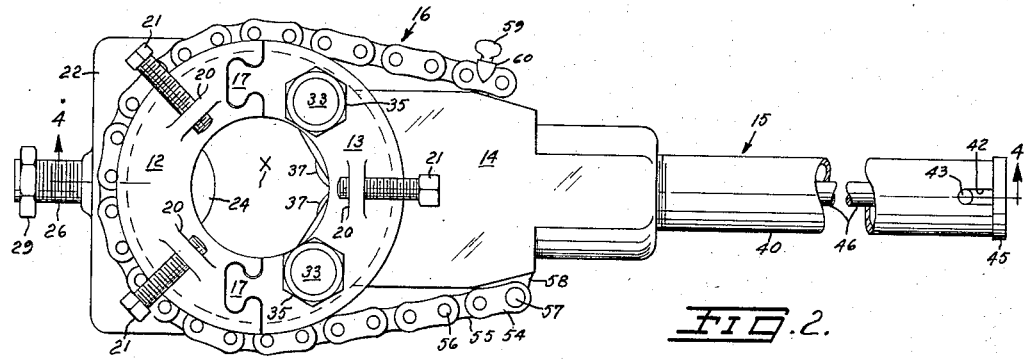
Fig. 2 is a reverse view of the pipe cutter shown in Fig. 1.
Figure 3:
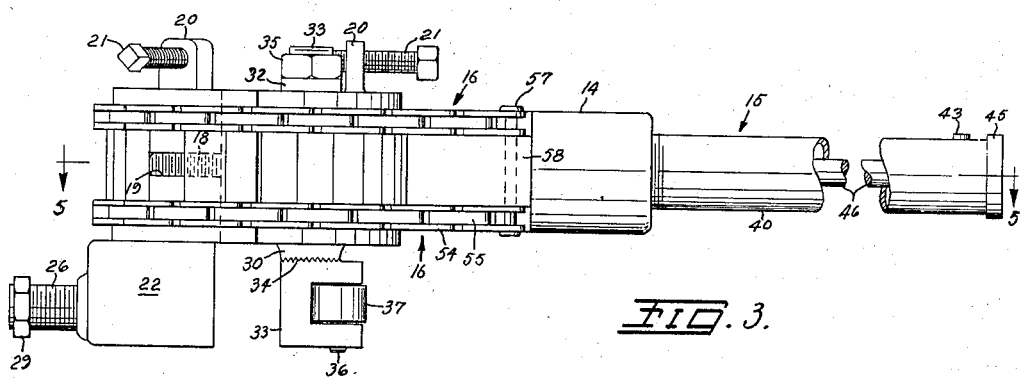
Fig. 3 is a view in lower side elevation of the pipe cutter as shown in Fig. 2.
Figure 1:
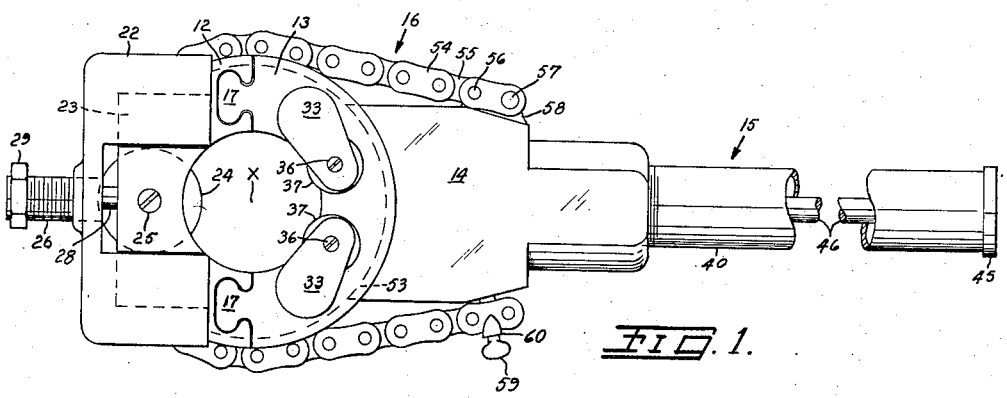
Fig. 1 is an obverse view or view from the cutter side in the pipe axial direction of a first species of the pipe cutter of this invention.

Referring first to the species of my pipe cutter shown in Figures 1 to 5, it is seen that the larger subassemblies of my pipe cutter include a pipe collar 12—13 having a cutter half 12 and a roller half 13, and an operating handle including a handle base 14, a handle extension 15 and a pair of chains 16. X in Figs. 1, 2 and 5 indicates the approximate axis of a pipe to which the cutter could be applied for cutting. As shown the parts of the cutter are shown as though in cutting position.

Cutter halves 12 and 13 are positioned around the pipe axis X from opposite sides thereof but offset axially one from the other and then moved axially toward each other so that T-shaped extensions 17 of collar half 13 are positioned in mating slots in collar half 12. When the respective mating ends of collar halves 12 and 13 are flush one with the other, set screws 18 in threaded holes 19 in collar half 12 are set up tightly against T parts 17 of collar part 13 to secure collar parts 12 and 13 as one unit collar 12—13 about the pipe.

Figure 4:
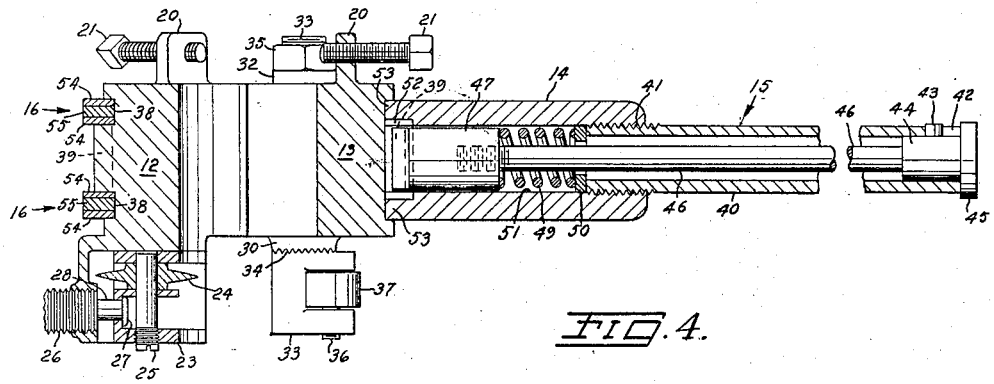
Fig. 4 is a view in side sectional elevation as viewed along the line 4—4 of Fig. 2.

On its reverse side, collar 12—13 is formed with bosses 20 through which set screws 21 are threaded to be loosely engaged radially against a pipe to be cut for the purpose of approximately centering the pipe in the collar 12—13. On its obverse side collar half 12 is formed with an integral housing 22, slidably to receive carriage 23 of circular cutter 24 rotatably secured thereon by threaded axle 25. Radially positioning screw 26 for carriage 23 of cutter 24 is threadedly secured through housing 22, as shown in Fig. 4, and has a head 27 and neck 28 formed on its inner end to be rotatably engaged in carriage 23, also shown in Fig. 4. Rotating screw 26 by its outer head 29 will move carriage 23 and cutter 24 radially of axis X as desired. On its obverse side collar half 13 is formed with a pair of bosses 30 having holes 31 formed centrally therethrough to extend through the reverse side of collar half 13 where they are surrounded by bosses 32.

Clevis headed bolts 33 journalled in holes 31 have the under sides of their clevis heads radially serrated so that when engaged with the serrated faces of bosses 30, as at 34, the tightening of nuts 35 on the unheaded ends of bolts 33 against the smooth faces of bosses 32 the angular positions of bolts 33 with respect to collar half 13 will be fixed by the intermeshed serrations at 34. Rotatably secured respectively in the clevis ends of bolts 33 by axles 36 having screw threaded ends, as shown, are rollers 37.

When a pipe to be cut is enclosed in collar 12—13 and loosely centered therein by set screw 21, nuts 35 of clevis headed bolts 33 may be loosed to allow bolts 33 to slip at 34 on bosses 30 and bolts 33 may be turned to position rollers 37 tangentially to the pipe in radially supporting position thereof. Then head 29 of screw 26 may be turned to move carriage 23 radially inwardly and press cutter 24 against the pipe which will then be confined between cutter 24 and rollers 37.

Pipe collar 12—13 is circumferentially formed with spaced annular grooves 38 to receive chains 16. See Fig. 4. Between grooves 38, on collar 12—13, ratchet teeth 39 are formed to make a ratchet gear of collar 12—13. See Figs. 4 and 5.

Figure 5:
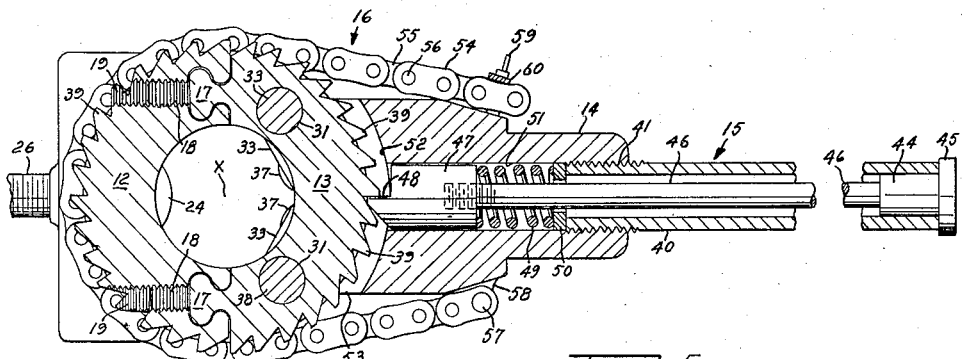
Fig. 5 is a view in reverse sectional elevation as viewed along the line 5—5 of Fig. 3.

Handle extension 15 is seen particularly in Figs. 4 and 5, to include a hollow cylindrical pipe 40 externally threaded at one end to engage handle base 14 at 41 and longitudinally slotted at the other end at 42 to receive detent 43 extending radially from hub 44 adjacent the head 45 of stem 46 of ratchet dog 47. Ratchet dog 47 is threadedly secured on its stem 46 with the driving face of dog tooth 48 parallel to the axis of detent 43. Spring 49 strained in compression between ratchet dog 47 at one end and washer 50 in abutment with pipe 40 at the other biases dog 47 toward engagement of its tooth 48 with ratchet teeth 39 of gear collar 12—13. When dog 47 is moved against the bias of spring 49 by pulling outwardly on head 45 of stem 46 so that detent 43 is moved out of slot 42 and then rotated and head 45 released, detent 43 will rest on the outer end of pipe 40 and tooth 48 of dog 47 will be held out of engagement with ratchet gear 12—13. Then if head 45 of stem 46 is rotated to again align detent 43 with slot 42, stem 46 and ratchet dog 47 will move into engagement of dog tooth 48 with ratchet gear teeth 39 because of the biasing effort of spring 49.

Handle base 14 has a longitudinal central hole 51 formed therethrough and internally threaded at one end securely to receive handle extension 15 as above described. At its other end handle base 14 (see Figs. 4 and 5) is formed with an arcuate slot 52 laterally bounded by a spaced pair of arcuate lips 53 adapted circumferentially to mate with spaced annular grooves 38 formed on the circumference of collar 12—13 to receive chains 16. With handle base 14 thus positioned on collar 12—13 ratchet teeth 39 of collar gear 12—13 are spanned and cleared in slot 52. Handle base 14 is held in assembly with collar 12—13 by the two spaced chains 16, each chain being made up of a series of pairs of side links 54 alternating with a center link 55 and secured together at adjacent ends with pivot rivets 56 as shown. Both of the chains 16 are pivotally secured to handle base 14 at one of their adjacent ends by rivet 57 extending through boss 58 outwardly extending from handle base 14. The other adjacent ends of chains 16 are secured on handle base 14 by a wing screw 59 extending through a saddle clamp 60 and threaded into base 14 between the chains 16, as shown.

With the assembly of the pipe cutter of Figs. 1 to 5 as shown and described it should be noted that when ready to be assembled on a pipe for the transverse cutting thereof the cutter will consist of three subassemblies. These assemblies will be (1) collar half 12 with the elements described above as attached thereto, (2) collar half 13 with the elements described above as attached thereto and handle base 14 with handle extension 15 secured thereto at 41 and chains 16 pivoted thereon at 57.

To assemble the pipe cutter parts to a pipe, the parts 12 and 13 are first assembled around the pipe as above described and locked together with set screws 18. Then set screws 21, rollers 37 and cutter 24 are set up on the pipe as above described with cutter 24 at the position on the pipe where the pipe is to be cut. Handle base 14 is then pressed against collar 12—13 with the arcuate lips 53 of base 14 pressed into circumferential grooves 38 of collar 12—13. Then chains 16 pivoted at 57 on handle base 14 are wrapped around collar 12—13 in grooves 38 and their other ends are secured as described to handle base 14 by wing screw 59 and saddle clamp 60.

With the complete pipe cutter assembled on the pipe as described, cutter wheel 24 is pressed against the pipe by turning screw 26 and collar 12—13 with wheel 24 is rotated around the pipe by the intermittent action of ratchet dog tooth 48 on collar gear teeth 39 as handle extension 15 is oscillated in a plane normal to the pipe. With repeated turning of screw 26 to tighten cutter wheel 24 against the pipe and repeated oscillation of handle 15 the pipe is quickly severed.

Having disclosed a first species of the new and useful ratchet driven pipe cutter of my invention and explained its operation to the extent that a worker skilled in the art could construct and make use of the disclosed species, it is apparent that the skilled worker would think of other ways of building such a pipe cutter without departing from the essence of my invention.

It is to be understood in the consideration of the species of this invention here disclosed that many of the machine elements used in the construction of the presently disclosed pipe cutters are well known and functional equivalents of them are well known so that it would be well within the scope of the present invention to form an equivalent pipe cutter having an equivalent machine element to one here shown. For instance it would not be considered outside the scope of this invention to use another type of one-way clutch instead of the ratchet drive here shown.

Having thus recited the primary object of the invention illustrated and described two forms in which the invention may be practiced and their operation explained, I claim:

1. An improved pipe cutter comprising a collar adapted rotatably to surround a pipe to be cut, a collar driving structure adapted to surround said collar rotatably therewith and thereon, said collar and said driving structure having a common first plane normal to a common axis, said collar being separable into two collar parts along a second plane including said axis, one of said collar parts being formed with a pair of spaced undercut slots parallel with said axis and opening into said second plane and the other of said collar parts being formed with a pair of T-parts parallel with said axis and crossing said second plane to fill said slots as said two collar parts are moved axially along said second plane into registry at said first plane, said collar driving structure including a pair of chains, a handle extending radially outwardly from said collar and secured rotatably thereon by said pair of chains spaced respectively on either side of said center plane, both of said chains being rotatably secured about said collar with both their ends connected to said handle to rotate said chains about said collar with said handle.

2. The improved pipe cutter of claim 1 in which said collar includes first means spaced from said first plane on one side thereof for supporting said collar on said pipe approximately concentrically therewith and said collar includes second means spaced from said first plane on the other side thereof for cutting said pipe.

3. The improved pipe cutter of claim 1 including clutch means cooperatively formed on said collar and carried on said handle for engaging said collar by said handle to rotate said collar about said pipe to sever said pipe as said handle is rotated about said pipe.

References Cited in the file of this patent

UNITED STATES PATENTS

| | | |
|---|---|---|
| 406,077 | Anderson | July 2, 1889 |
| 1,197,247 | Wood | Sept. 5, 1916 |
| 1,737,889 | McKnight et al. | Dec. 3, 1929 |
| 2,379,177 | Pavey | June 26, 1945 |
| 2,697,875 | McIvar | Dec. 28, 1954 |

FOREIGN PATENTS

| | | |
|---|---|---|
| 11,170 | Sweden | Apr. 2, 1898 |
| 334,972 | Germany | Mar. 23, 1921 |